United States Patent [19]

Boehnlein et al.

[11] Patent Number: 5,307,152
[45] Date of Patent: Apr. 26, 1994

[54] MOIRE INSPECTION SYSTEM

[75] Inventors: Albert Boehnlein, Ypsilanti; Kevin Harding, Ann Arbor, both of Mich.

[73] Assignee: Industrial Technology Institute, Ann Arbor, Mich.

[21] Appl. No.: 954,761

[22] Filed: Sep. 29, 1992

[51] Int. Cl.$^5$ .............................................. G01B 11/24
[52] U.S. Cl. ................................. 356/376; 250/237 G
[58] Field of Search ...................... 356/376; 250/237 G

[56] References Cited

U.S. PATENT DOCUMENTS

| | | | |
|---|---|---|---|
| 4,212,073 | 7/1980 | Balasubramanian | 356/376 |
| 4,794,550 | 12/1988 | Greivenkamp, Jr. | 356/357 |
| 5,202,749 | 4/1993 | Pfister | 356/376 |

FOREIGN PATENT DOCUMENTS 0121353 6/1984 European Pat. Off. .

OTHER PUBLICATIONS

Kevin G. Harding, "Comparison of Sheet Metal Inspection Techniques", *Sensor Expo '87*. (Helmers Publisher).
Albert Boehnlein, et al., "Field Shift Moire", *SPIE vol. 1163 Fringer Pattern Analysis*, pp. 1-13 (1989).
Diffracto Limited Brochure, "D Sight TM Audio Station" undated.
Kevin Harding, "Moire Interferometry for Industrial Inspection", *Lasers & Applications*, pp. 73-78 Nov. 1983.
Albert Boehnlein et al., "Adaptation of a parallel arch. computer to phase shifted moire interferometry", *SPIE vol. 728 Optics, Illum. & Image Sensing for Machine Vision*, pp. 183-194 '86.
R. Dandiker et al., "Heterodyne and quasi-heterodyne holographic interferometry", *Optical Engineering vol. 24 No. 5*, pp. 824-831, Sep./Oct. 1985.
Kevin Harding, et al., "Small angle moire contouring", *SPIE Cambridge '87 meeting*, 1987.
P. Hariharan, et al., "Digital phase-shifting inteferometry: a simple error-compensating phase calculation algorithm", *Applied Optics*, vol. 26, No. 13, pp. 2504-2507, Jul. 1987.
Katherine Creath, et al., "Interferometric measurement of the roughness of machined parts", undated.
G. T. Reid, et al., "3-D machine vision for automatic measurements of complex shapes", pp. 129-138 undated.
F. P. Chiang, "Fringe Shifting in Various Moire Methods", pp. 99-114 undated.

*Primary Examiner*—F. L. Evans
*Attorney, Agent, or Firm*—Harness, Dickey & Pierce

[57] ABSTRACT

A moire interferometry system for detecting defects in a surface of a panel. The moire interferometry system is adapted to be used as a defect detection tool and not specifically as a surface measurement tool. The system includes a moire projection system having a light source and master grating projecting grating lines onto a surface panel to be inspected. A viewing system with a detection means records an image of the surface with the master grating lines on it as viewed through a submaster grating. The intersection of the projected lines on the panel and the lines in the submaster grating produce moire fringes. Phase shift interferometry techniques are used to produce a phase map of the surface for a plurality of phase shifted moire fringes. A derivative operation is performed on the image, and that image thresholded to identify areas of pixels having the greatest change in contour. The resulting image can then be used to locate and quantify deviations in the contour of the panel which exceed predetermined tolerances to identify defects. The system provides an unambiguous quantitative means for characterizing defects which does not require skilled operators or the application of highlighting fluid to the surface.

24 Claims, 5 Drawing Sheets

MOIRE INSPECTION SYSTEM

BACKGROUND OF THE INVENTION

1. Technical Field

The present invention relates to systems and methods for the detection of surface defects and more particularly to the application of moire interferometry to the detection of surface defects.

2. Discussion

There are a variety of approaches to the inspection of defects on panels of sheet metal or other materials. In general, these approaches attempt to distinguish shape anomalies such as dents, flat spots, creases, or waviness. However, the commonly used inspection techniques for these features is very subjective in nature. For example, a popular dent inspection method, uses an oil-type of highlighting fluid to provide a glossy finish similar to that seen on the finished panel. An inspector then looks at the edge of colored fluorescent tubes placed around the panel as reflected from the surface of the panel. If the inspector detects the presence of a "wave" in the edge of the light as he moves his head past an area, he marks it as having a dent or "error" in the contour.

In such systems, the surface of the panel is acting as a mirror. The light reflected from the panel is deviated according to the surface slope, thereby creating a distorted image of the light fixture. Since the image is always distorted in accordance with the shape of the panel, the inspector is actually looking for some out of the ordinary distortion, such as a sudden change in an area expected to be flat.

There are a number of disadvantages with this type of inspection technique. Both the application of the highlighting fluid and the technique of inspection is time consuming and requires a highly skilled inspector for consistent results; and the technique remains relatively subjective. Also, the oil is messy and must be cleaned off. Markings, surface finish irregularities or an uneven highlighting fluid application, can effect the results. Further, the angle of viewing can become critical. For example, in the case of a car panel, many car owners become aware of irregular contours on the hood of their car when driving under power lines by the way their reflections move over the hood. Different areas of the car are viewed at different angles, relative to the normal to the surface, causing variations in the visibility of such defects. Likewise, for the same reason, the structured light in the highlighting technique is also subject to great sensitivity to viewing angle. Further, since human visual perception is most sensitive to changes from the surrounding area, a dent or flat area seen in one area which has little shape to it, may not be perceived in an area having sharp transitions.

A number of alternative, less subjective techniques have been developed for inspection, which makes use of the measurement of the contour of an object in three dimensions. These approaches include range finding techniques including line of light profiling, stereo viewing, shape from shading, and moire interferometry. While line of light profiling can be simple to analyze, and is largely insensitive to surface reflectivities and background light, it is more suited to providing individual profiles of a surface requiring many video images to fully cover a surface. The sensitivity to a shape anomaly is limited by the video camera resolution.

Stereo viewing requires some surface features to correlate, not necessarily available on sheet metal panels, and can be computer intensive. Shape from shading can capture a full field of information at a time using a grey scale type analysis which is easily executed on modern machine vision systems. However, shading techniques can be fooled by stray lighting, surface reflectivity variations or marks on the panel surface.

Moire interferometry provides full field process data with grey scale values that can be made insensitive to lighting variations, dirt, and other non-shaped parameters. Also, the depth resolution in moire is not limited by the camera resolution as in line of sight systems. However, moire interferometry requires greater demands on the optical system than other methods. Further, prior moire interferometry systems have not been adapted for large panel inspection but instead have been adapted to perform range measurements on small areas. As a result, current moire interferometry systems are generally not large enough to perform analysis on large panel surfaces. In general, conventional moire systems are used as a surface measurement tool, but not as a defect detection tool.

Thus, it would be desirable to provide a panel inspection system which does not require the application of a highlighting fluid, and which is less labor intensive than conventional highlighting techniques. Further, it would be desirable to provide a panel inspection system which does not rely on subjective observations of the inspector. Also, it would be desirable to provide a panel inspection system which provides a means for characterizing defects in an unambiguous quantitative manner.

SUMMARY OF THE INVENTION

Pursuant to the present invention, a moire interferometry system is provided for detecting defects in a surface. The system includes a projection system having a light source and master grating, which projects grating lines onto the surface to be inspected. Also, a viewing system is included having a detection means for recording an image of the surface and a submaster grating. The detection means is disposed so as to view the master grating lines projected on the surface through the submaster grating. The intersection of the projected lines on the surface and the lines on said submaster grating produce moire fringes. A mechanism for introducing a phase shift in the moire fringes is used to produce a phase map of the surface for a plurality of phase-shifted moire fringes. The system includes a means for normalizing the phase map by subtracting a reference phase map from the phase map. The system then performs a derivative operation on the image, produces a derivative image and thresholds the third-derivative image so that pixels exceeding the threshold are identified as having the largest change in contour. The resulting image can then be used to locate and quantify deviations in the contour of the panel, for example, to identify defects.

In accordance with a second aspect of the present invention, a method for measuring the shape of a contoured surface using moire interferometry is provided. The method includes the steps of providing a moire interferometry system which includes a projection system, a light source and master grating. A viewing system is also provided which includes a means for recording an image on the surface and a submaster grating. Lines of the master grating are then projected onto the surface using the light source. The lines on the surface are recorded by the means for recording as viewed through the submaster grating. In this way, the intersection of the projected lines on the surface and the lines on the submaster grating produce moire fringes. Next, a phase shift is introduced into the moire fringes, and a phase map of a plurality of phase-shifted moire fringes is produced. The phase map is normalized by subtracting a reference phase map from the phase map and a derivative operation is performed on the image to produce a derivative image. The derivative image is then thresholded so that pixels in the third derivative image exceeding the threshold identified as having the largest change in contour.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

As discussed above, a popular panel inspection method is to use an oil-type of highlighting fluid to provide a glossy finish similar to that seen on a finished painted panel. An inspector then looks at the edge of fluorescent tubes placed around the panel as reflected from the surface of the panel. If the inspector detects the presence of a wave "in the edge of the light as he moves his head past an area" it is marked as having a dent or error in the contour.

Figure 1:
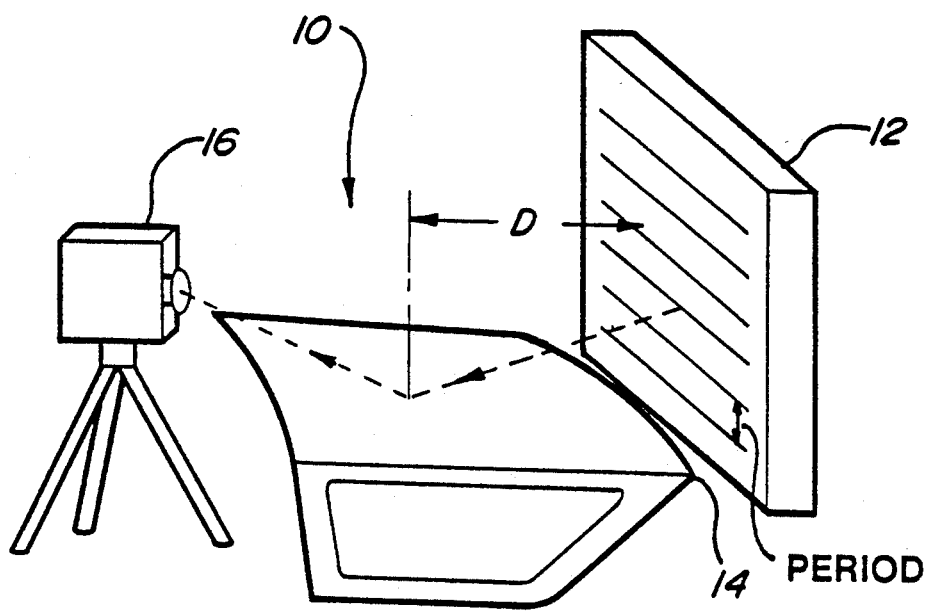
FIG. 1 is a diagram of a system for defect inspection of a highlighted panel.

In this configuration, the surface of the panel is acting as a mirror, and the light reflected from the panel is deviated according to the surface slope in accordance with the laws of reflection, creating a distorted image of the light fixture. The inspector is looking for some "out of the ordinary" distortion such as a sudden change in an area he expects to be flat. In areas which should have sudden contour changes, the inspector may be looking for a flat area where the surface is expected to be very curved. It should be appreciated that no one decision is necessarily used to inspect the panel. The final analysis of what features or distortions in the reflected image seen off the panel are important is left up to the inspector. So, it should be noted that dirt levels, unevenness of oil highlight, or light level fluctuations may create subjective variations in the results. One improvement on this technique is shown in FIG. 1 in which a defect inspection system using a highlighting system is shown. This system 10 is an improvement over the commonly used method discussed above where an inspector views the edge of fluorescent tubes placed around the panel as reflected from the surface of the highlighted panel. The system 10 in FIG. 1 improves on this situation by providing a less subjective means of quantifying defects in a highlighted panel. In this system, a backlet grid pattern 12 is viewed in reflection off the highlighted panel 14 by a camera 16. One advantage of this system 10 is that the entire panel surface can be inspected from one view rather than requiring multiple views to inspect a whole panel. However, this system still requires the panel to be highlighted and does not provide the precise quantitative contour information which is possible using interferometric techniques.

Interferometric techniques have long been used to obtain high resolution, full-field shape information. For example, holographic interferometry provides a very high sensitivity to changes in a structure due to stress, heat, vibrations, flaws, or deformations. However, one of the primary strengths of holographic interferometry, high sensitivity, is also a primary limitation. This is because the amplitudes of the changes being measured are often beyond the upper range of holographic interferometry.

Another full-field non-contact measurement technique, moire interferometry, offers many of the testing capabilities of holographic interferometry with an important difference. The sensitivity in moire interferometry can be adjusted to fit the application requirements. As a result, moire interferometry can be very tolerant to positioning errors or extraneous motions. A moire pattern is made by forming a subject grating; by projecting, shadowing, or contacting the grating onto the object being measured; and comparing this grating to some reference grating by overlaying the two grating images. If the reference grating is a straight-line grating, the beat pattern between the two gratings will form a contour map of the object's surface in the same way that a topographical map delineates the contours of land. One problem with moire interferometry is that a static interferogram suffers from a lack of information to distinguish a hill from a valley. However, by shifting the phase of the fringe pattern, the sign of the slope of the contour can be determined. However, there remains an ambiguity when the surface in question has a discontinuous jump. For further discussion of phase shifting techniques, see A. J. Boehnlein and K. G. Harding, "Adaptation of a Parallel Architecture Computer to Phase Shifted Moire Interferometry", SPIE, Vol. 28, *Optics, Illumination and Image Sensing for Machine Vision*, pp. 144-183 (1986), which is hereby incorporated by reference. An alternative to phase shifting techniques is the field shift technique which is described in A. Boehnlein, K. Harding "Field Shift Moire, A New Technique for Absolute Range Measurement", SPIE, vol. 1163, *Fringe Pattern Analysis*, pp. 2-13 (1989), which is hereby incorporated by reference.

Figure 2:
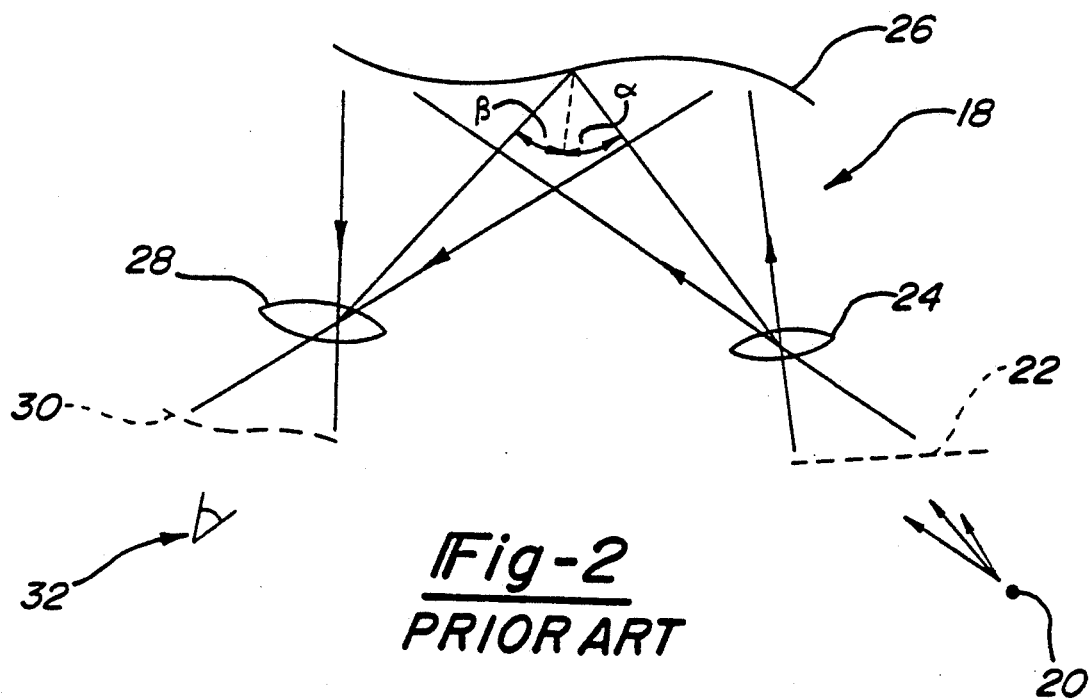
FIG. 2 is a diagram of a moire interferometry system in accordance with the prior art.

Referring now to FIG. 2, a diagram of a simple conventional moire system 18 is shown. A light source 20 emits light which passes through a master grating 22, and then through a projection lens 24 to image the grating onto a contoured surface 26. This surface 26 is then imaged back to a reference plane through a second lens 28 and also through a reference grating 30 where it is seen by a viewer or other detection means 32. The angle of incidence of the projected grating pattern on the surface 26 is $\alpha$, and the viewing angle is designated by $\beta$. The sensitivity of moire contouring is given by the same relationship as other triangulation methods, i.e.

$$Z = p/(\tan(i) + \tan(v))$$

where
p = the grating period on the object;
i = the angle of incidence of the projected grating pattern;
v = the viewing angle; and
Z = the sensitivity per fringe.

Since moire is a full-field technique, the contour of an entire area of an object can be mapped out at one time. This allows anomalies as well as large-scale shape features to be viewed and measured to the same precision and at the same point in time. This is important in situation where thermal drift or other factors may be warping the part with time. Small local anomalies which might be missed using a point by point measurement method will not be missed with a full-field approach, since there are no unmeasured areas. Full-field contouring is inherently much faster than point by point or line by line methods, potentially permitting on the fly measurements.

Also, it should be noted that the reference grating 30 may be made by recording the image of the object grating. In this way, the moire pattern can be used to show only differences between the reference state of an object and some new object or state. In this way, for example, moire can be used to show only deviations from a good part. When applied to an on-line inspection system, this difference moire approach greatly reduces the amount of information to be analyzed to determine if a part is within tolerances or to simply identify the part.

The distinct characteristics of moire machine vision makes it particularly suitable to many industrial applications, where other systems would not perform well. Unlike systems which depend on surface marks or shading effects, moire contouring is very amenable to dirty or hostile manufacturing environments. Many facilities and interferometer manufacturers have incorporated computer systems to digitize and analyze fringe data much like those from moire contouring.

The sign of the slope being measured can be determined by a variety of methods. The common technique to use in classical interferometry is to introduce a bias fringe, greater than the slopes encountered, so that all slopes seen have the same sign. This is equivalent to tilting the part, in many cases. With moire methods, there are other options to determine slope direction such as moving one grating with respect to the other (the fringes will move in different directions depending on whether the slope is positive or negative), moving the object between two consecutive recordings or using mismatched gratings. Many of these techniques, however, are not amendable to fast automation techniques but rather work from prerecorded patterns or use human interpretation skill. Phase shifting interferometry is one technique which is adaptable to fast automation. In phase shifting, the fringe pattern is effectively shifted by part of a fringe by moving one of the gratings a known amount, less than one full fringe. The fringes move in a direction determined by the slope of the surface. Three such positions are recorded, and compared to uniquely determine the slopes and depths of the surface. Any features which do not move with the grating, such as the illumination of dark areas in the part, do not enter into the result, making this method insensitive to interferences from the environment and surface conditions on the part. Another technique is the aforementioned field shifting technique.

These and other digital heterdyne techniques have been developed to process fringe data. In these techniques the intensity of the image at each pixel is assumed to be:

$$I[x,y] = I_o[x,y](1 + m[x,y] \cos(a[x,y]))$$

where:
I is intensity;
$I_o$ is the mean intensity;
m is the fringe contrast;
a is the phase angle;
x is the x coordinate of the point on the model; and
y is the y coordinate of the point on the model.

Figure 3:
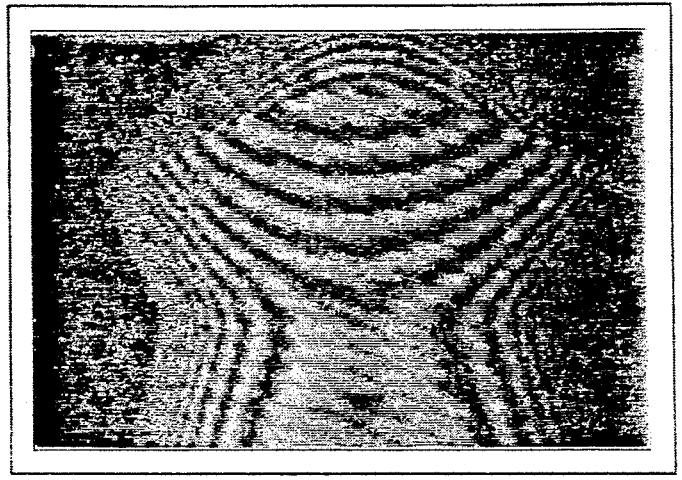
FIG. 3 is a typical moire fringe pattern.

The target variable is a[x,y]. This is the phase angle of the fringe which is related to some physical phenomena. The measurements can be any thing from displacement and strain fields to density gradients, depending on how the fringe data was formed. In this paper, the phase angle is a measure of the surface height of an object. A typical moire fringe pattern is shown in FIG. 3.

$I_o[x,y]$ is the average illumination. The fringe contrast, m, is a function of the illumination of the image that contributes to the fringes. This quantity is a measure of the quality of the fringes at a specific location on the model surface. If the fringes are washed out, saturated, out of focus, etc., the value of m will decrease and the accuracy of the fringe analysis will be degraded.

The goal of the algorithm is to solve for one or more of these quantities. Most notable is the phase angle. Also of interest, is the fringe contrast. This information can be used to create a mask to separate good data points from bad data points.

One approach to solve for these quantities, is to introduce a phase shift, s. Here this is accomplished by physically translating the grating. Capturing three images at three different, but known phase shifts, results in three equations and three unknowns.

$$I1[x,y] = I_o[x,y]\{1 + m[x,y] * \cos(a[x,y] + s1)\}$$

$$I2[x,y] = I_o[x,y]\{1 + m[x,y] * \cos(a[x,y] + s2)\}$$

$$I3[x,y] = I_o[x,y]\{1 + m[x,y] * \cos(a[x,y] + s3)\}$$

Solving these three equations yields:

$$\tan(a[x,y]) = \frac{(I3 - I2)\cos(s1) + (I1 - I3)\cos(s2) + (I2 - I1)\cos(s3)}{(I3) - I2)\sin(s1) + (I1 - I3)\sin(s2) + (I2 - I1)\sin(s3)}$$

By using phase shifts of 90 degrees, the equation reduces down to:

$$\tan(a[x,y]) = \frac{(I1 - I3)}{(2*I2 - I1 - I3)}$$

The math required to perform this operation is subtraction and a two input inverse tangent function. The result of this calculation is a phase map of the surface, modulo two pi. The phase angle in modulo two pi is linearly related to the change in surface height of adjacent points on surface that lay on the same fringe. A discontinuity exists between adjacent fringes, where the phase jumps from 360 degrees to 0 degrees. Since this operation must be carried out on all of the pixels in exactly the same way, it lends itself well to parallel processing.

Figure 4:
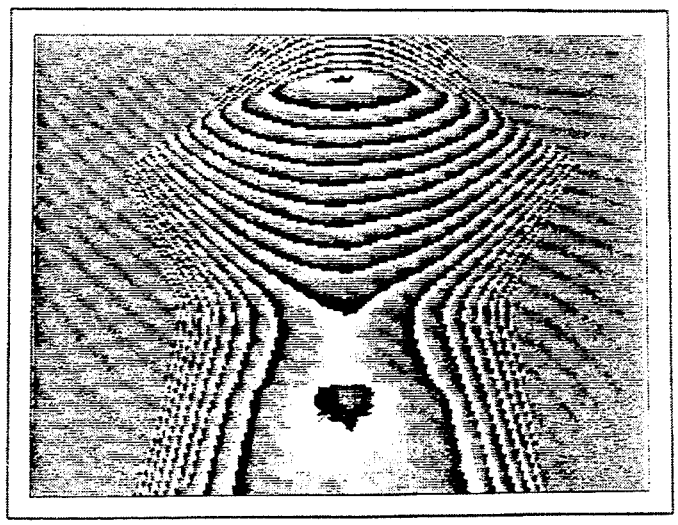
FIG. 4 is a phase map of the moire fringe pattern of FIG. 3 produced using a phase shift technique.

Visually, the fringes are transformed form a sinusoid to a "saw tooth" intensity profile. This can be seen in a comparison of FIGS. 3 and 4. This is the key to determining the integer part of the phase map.

To unfold modulo 2 pi integer phase information from the fractional phase map, adjacent pixels are compared to find a difference in phase that is greater than pi or less than pi.

The integer phase is adjusted to compensate for the 2 pi discontinuities in three steps. First, the integer phase is calculated in the vertical direction by:

$$k1(xi,y1) = 0;$$

$$k1(Xi,Yj) = \begin{cases} k1(xi,yj1) \text{ if } |n(xi,Yj) - n(Xi,Yj - 1)| < 180 \text{ degrees} \\ K1(xi,Yj - 1) + 1 \text{ if } n(xi,Yj) - n(xi,Yj - 1) <= -180 \text{ degrees} \\ k1(xi,Yj - 1)1 \text{ if } n(xi,Yj) - n(Xi,Yj - 1) >= 180 \text{ degrees} \end{cases}$$

for $i = 2, 3 \ldots$
$j = 2, 3 \ldots$

Next, a single line of integer phase is calculated in the horizontal direction for a vertical position, Y, equal to an arbitrary constant c.

$$k2(X1,Y1) = 0;$$

$$k2(Xi,Yc) = \begin{cases} 2(Xi1,Yc) \text{ if } |n(Xi+,Yc) - n(Xi - 1,Yc)| < 180 \text{ degrees} \\ k2(Xi - 1,Yc) + 1 \text{ if } n(Xi,Yc) - n(Xi - 1,Yc) <= -180 \text{ degrees} \\ k2(Xi - 1,Yc) - 1 \text{ if } n(Xi,Yc) - n(Xi - 1,Yc) >= 180 \text{ degrees} \end{cases}$$

for $i = 2, 3 \ldots$

K2 is used to synchronize the integer phase map, k1, by setting k1 equal to k2 at the line y=C. This is done by subtracting k2 from k1. The result, k3, is used as a constant to add to every column of k1. That is:

$$k3(Xi,Yc) = k2(Xi,Yc) - k1(Xi,Yc)$$
$$K(Xi,Yj) = k1(Xi,Yj) + k3(Xi,Yc)$$

for $i = 2, 3 \ldots$
$j = 2, 3 \ldots$

In practice, this is accomplished by shifting the image one pixel to the right and subtracting from itself. Visually, the result is a grey image, with the fringe edges outlined in white and black. The white signifies an "up edge" and indicates that the integer part of the phase should be decremented. Conversely, the black is considered a "down edge", and the integer phase is incremented. This can be thought of as an integration of binary fringes. Since this is an iterative process, it does not lend itself as well to parallel processing as the fractional fringe calculation. Due to this, the integer fringe calculation is somewhat slower than the latter, albeit it is a simpler operation.

Two values have now been generated for each pixel from the original three images. By using the integer phase number as the most significant byte and the fractional phase as the least significant byte, a sixteen bit number is generated that represents the height of the surface at each pixel.

For a given point on the surface, the actual height is given as:

$$h = (K + a/2pi)Z$$

where
h is height
K is the integer fringe number
a is the fractional fringe number
Z is the fringe resolution The accuracy of the numbers that are generated is dependent on the quality of the original image. Since the fringe contrast, m, is a measure of the fringe quality, it yields information about the accuracy of the processed data. If the contrast exceeds a minimum value at a point, then that data point is considered a good data point. This information is then implemented as a mask in the construction of the phase map.

An added benefit of using the fringe contrast is the ability to mask out the background. This is possible due to the fact that the imaging system has a limited depth of focus. Any object in the scene that is out of focus will automatically be masked out because it will have a low fringe contrast value.

Figure 5:
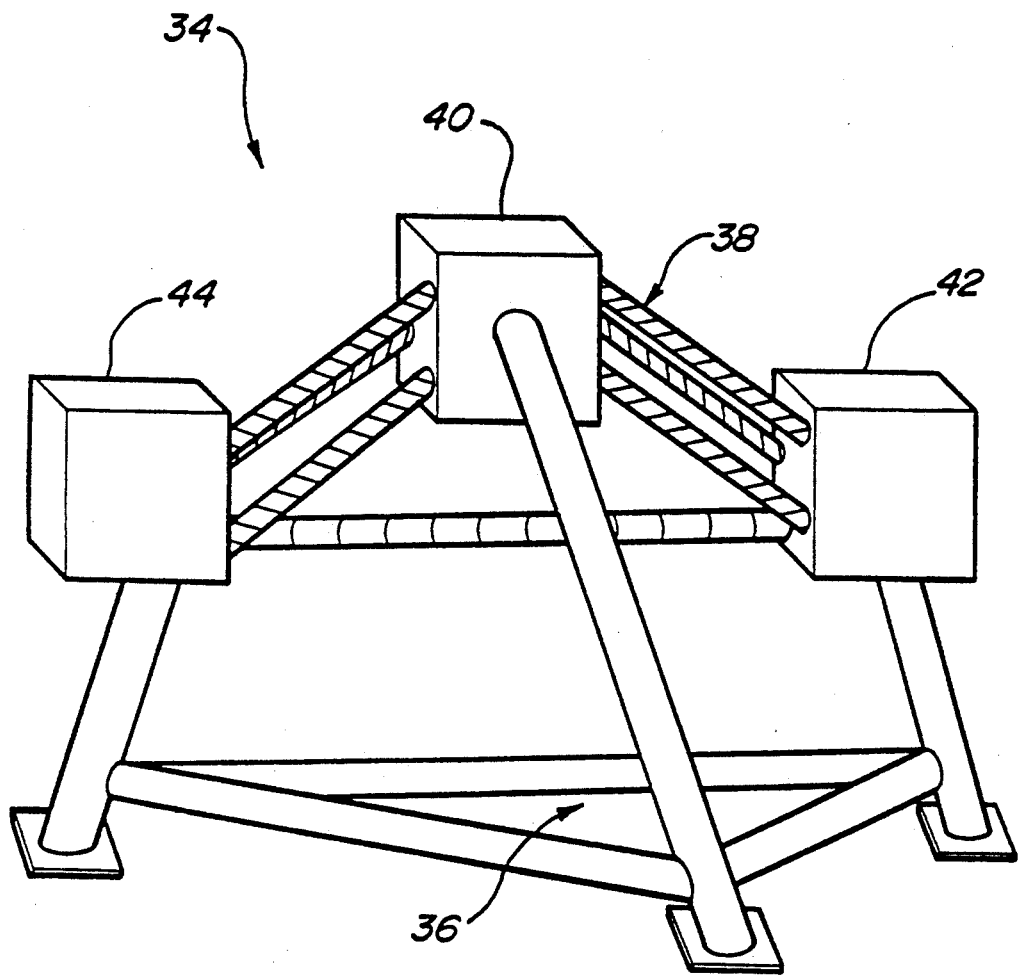
FIG. 5 is a diagram of the general structure of a panel defect inspection system in accordance with a present invention.

Applying these techniques to the panel inspection problem shown in FIG. 1, the system 34 in accordance with the present invention is shown in FIG. 5. A panel to be inspected is placed in an interior area 36 of the inspection structural frame 38. The structural frame 38 supports a projection system 40 and two viewing systems 42 and 44. It should be noted that the structure 38 is large enough to accommodate relatively large panels such as auto body panels. However, the basic design of the system 34 can be scaled to accommodate a wide variety of panel sizes.

Figure 6:
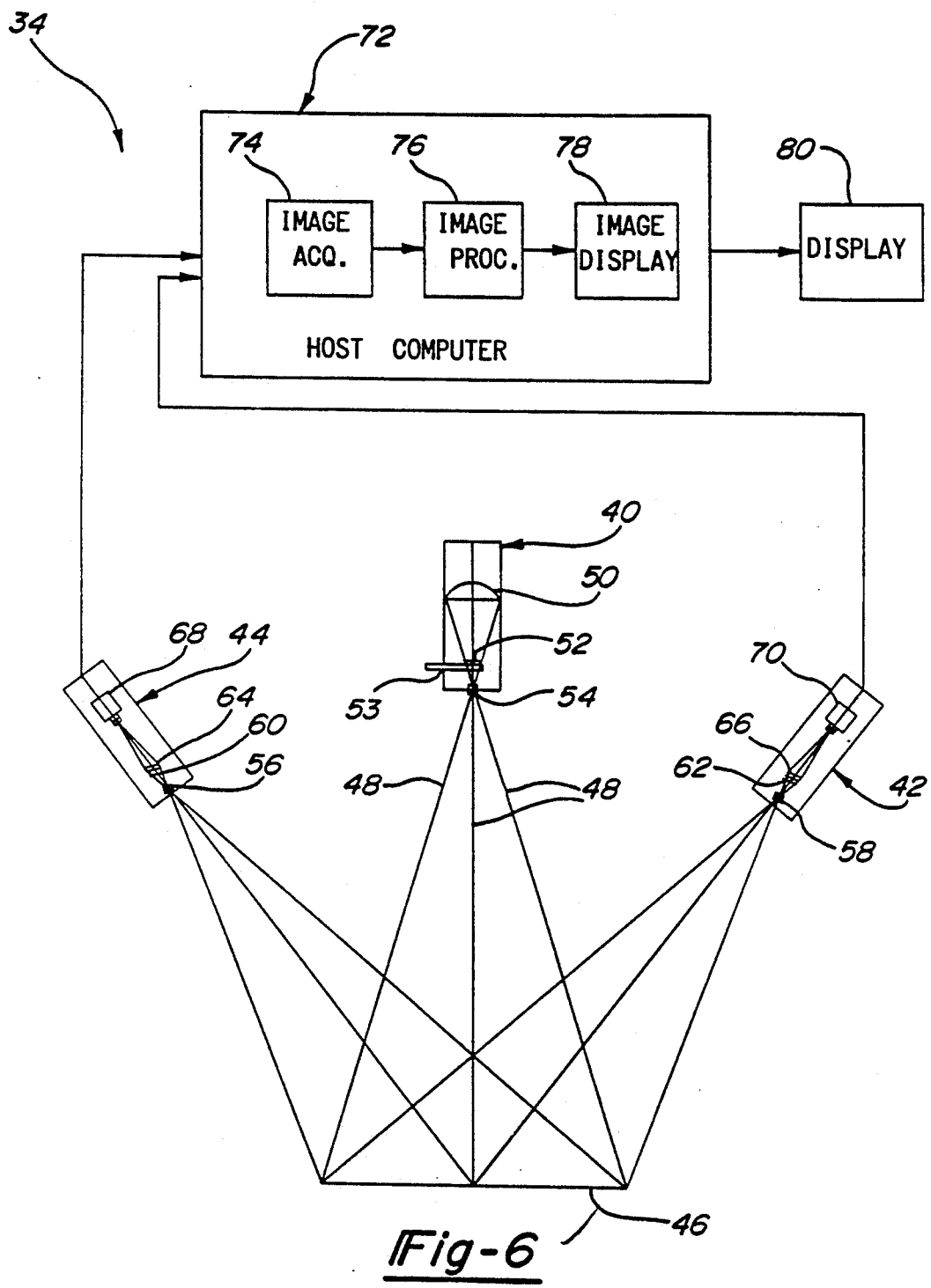
FIG. 6 is a diagram of further detail of the moire panel inspection system shown in FIG. 5.

In more detail, FIG. 6 shows the panel 46 with light rays 48 from the projection system 40 striking the panel from overhead. The projection system 40 includes a light source 50 which includes an aspheric reflector and an arc lamp source. Also, a grating 52 is included which may include a 4×5 inch, 500 lines per inch chrome on quartz type grating. This grating 52 corresponds to the master grating 14 of FIG. 2. A projection lens 54 is disposed so as to image the lines of the grating 52 onto the panel 46. This lens may comprise, for example, a 150 millimeter F 5.6 Rodagon-G lens. Grating 52 is mounted on a translation stage 53 which is used to produce the desired phase shift as described in more detail below. Translation stage 53 may comprise a precision motorized micrometer driving a translation stage. A suitable micrometer may read out tenths of a micron with repeatability of 0.02 microns.

In accordance with the preferred embodiment, two viewing systems 42 and 44 are employed. These permit two views of the panel to be achieved so that a bright spot caused by the light from the projection system 40 will occur at a different location in each view so that a full panel view may be achieved. However, in general, such bright spots are not a serious problem, and a single viewing system will be adequate in many applications. Each viewing system includes a lens 56, 58 which may be the same lens as lens 54 in the projection system. Also, submaster gratings 60, 62 is disposed behind the lenses 56, 58 which correspond to the submaster grating 30 in FIG. 2. In the preferred embodiment, the submaster grating is constructed from the view of the master grating 52 projected onto a reference panel 46. The reference panel should be one that is considered a good panel and should be positioned within easily accessible limits (about 0.1 inches). This will require a different submaster grating pair 60, 62 to be constructed for each new panel type. In this way, the general shape of the panel is subtracted out so that the data to be analyzed is greatly simplified and that only areas of potential defect, or at least variations in shape, will show up in the data. In the preferred embodiment, the submaster gratings 68, 62 are constructed from a 4 inch by 5 inch holographic plate in accordance with well-known techniques. In the preferred embodiment, the grid pattern projected onto the panel 46 is too small to be resolved by the cameras in the viewing systems 42, 44. Thus, the moire beat pattern is all that the cameras pick up. However, the grid should not be too fine, otherwise it would not show up on the sheet metal because of the surface roughness in such panels. Thus, it is preferred that the grid pattern be made as large as possible without being resolved by the cameras.

The viewing systems 42, 44 also include field lenses 64, 66, which may comprise a pair of 178 millimeter pcx 101.6 diameter condensers which serve to direct the light from the imaging lens 56, 58 to the camera lens 68, 70. Each viewing system 42, 44 also has a detector 68, 70 for detecting the moire fringes thereby produced. The detector may comprise, for example, a ccd camera such as an MS-4030 high resolution camera with a 16 millimeter c-mount Fujinon lens. It should also be noted that the angle which the viewing systems 42 and 44 are positioned with respect to the panel 46 can be optimized to permit the viewing of a maximum depth of contour in the panel at a reasonable angle. For example, the tilt and the focus of the lenses can be adjusted along with the angle of incidence of the viewing systems 42, 44 to optimize what is referred to as the Shinflug condition.

In accordance with a preferred embodiment, the basic parameters of the system include:
projected field = six foot diameter
viewed field approximately 4'×6.5', (6'×6' available by turning cameras)
usable depth greater than 8"
depth resolution (defect size) 0.0002"
fringe contour interval = 0.015"
area resolution 0.025" (approximately the human resolution limit)

In accordance with the present invention, it is desired in addition to the information of the general panel contour to locate features or areas of high slope on the panel. To this end, the present invention provides image processing programs 74, 76 and 78 to facilitate the detection and display of these high slope areas which may be the result of defects of small pimples or dents on the panel.

The viewing systems 42, 44 are coupled to a host computer 72 which may comprise a Model 3,000 manufactured by Applied Intellegence Systems, Inc. Host computer 72 will perform the processing of the moire images from viewing systems 42, 44 in accordance with the techniques of the present invention discussed below. Host computer 72 includes an image acquisition software module 74 which processes the phase shifted moire image information from the viewing units 42, 44 and produce phase maps as described in more detail below. Also, an image processing software module 76 uses the information produced by the image acquisition software 74 to produce derivatives of the defect surface in accordance with the present invention. An image display software module 78 uses the processed image information from the image processing software 76 to produce a display which simulates the reflection of a picket fence in the panel to facilitate the visualization of defects in the panel 46. A display unit 80 is also coupled to the host computer 72 to permit the visual display of the information produced by software modules 74, 76 and 78.

In more detail, the image acquisition program 74, in accordance with the preferred embodiment of the present invention, acquires and sums 16 images per bucket. That is, in accordance with the well-known five bucket moire phase shifting algorithm, 16 images in each of five phase-shifted moire patterns, are added together. This results in five 12-bit images. Thus each pixel in these 12-bit images can range in value from 0 to 4,096.

Next, the 12-bit images are normalized so they fit into 8-bit space. One method of normalizing the 12-bit images is as follows: if the pixel value for a given location in the image is greater than 255, then all of the pixels in that location in the five buckets are divided by two. This algorithm is performed four times to ensure that all of the pixel values are less than 255 and will fit into an 8-bit frame store.

Next, the five bucket algorithm is used to extract fractional phase and contrast. Fractional phase is defined as the phase of the interference pattern, modulo pi. Contrast is defined as depth of modulation of the interference pattern.

Next, pixels with contrast less than a specified value are discarded. This is done because phase data at these pixels is to noisy to be useful. Well known modulo pi phase unwrapping techniques are used to extract integer phase resulting in a raw phase map.

Prior to beginning the analysis of a panel, a reference phase map is produced using a known "good" panel. This reference phase map is stored on disk and is now subtracted from the raw phase map derived for the new panel. This results in a normalized phase map, which is then stored on disk. It will also be appreciated that, over time, the optical system of the present invention will shift and drift somewhat due to temperature and vibration effects. For example, this is why the reference phase map is subtracted from the raw map to achieve the normalized phase map. This completes the steps performed by the image acquisition software 74.

Next, the image processing software 76 selects a range image (phase map) produced by the image acquisition software 74 and reads it from the disk.

At this point, various smoothing and hole-filling operations are performed to prepare the image for the following derivatives. Since taking a derivative will amplify noise and bumps in the panel which are too small to be of concern, this step will remove them.

Next, a first derivative operation is performed on the image three times, resulting in first, second and third derivatives. In more detail, the derivatives are calculated using the 3 point central difference formula. The smoothing and hole-filling operations may also be performed between successive derivatives. (For example, well-known smoothing and hole-filling operations that may be used include averaging filters and median filters.)

Next, the image processing software 76 determines if any clusters of pixels in the third derivative image exceed a threshold value. In more detail, in the preferred embodiment, this would require a user specified number of contiguous pixels to exceed a threshold value. These pixels are then flagged by the software as a defect. The defects and the derivatives of the defect surface can then be viewed directly by the display unit 80, or with an enhanced display technique such as the picket fence display produced by the image display software 78.

In more detail, the picket fence display simulates what the panel 46 would look like, after it is painted, if it were passing by and reflecting an image of a picket fence. The display simulates the reflection of a picket fence in the panel to enable an inspector to readily visualize defects. This is done by approximating a ray tracing an image of a picket fence reflected off the panel. Ray tracing techniques are well-known techniques for producing computer animated images. Further details of such ray tracing techniques may be found in "Elements of Modern Oporcal Design" Donald C. O'Shea, John Wiley & Sons, New York (1985) which is herein incorporated by reference. The result is equivalent to the above-discussed highlighting technique. As the bars of the picket fence travel continuously across the surface, it can be seen that the bars get bigger and smaller as they travel over lumps in the surface due to the simulated distortion of the image over the distorted panel.

Several assumptions are made which enable the simulation to be simplified and run very fast. The algorithm runs in real-time and can create an animated display of the ray-traced image. Once an image is created, the algorithm is as follows:

$$\text{line}(x,y) = \text{first\_derivative}(x,y) + \text{ramp}(x,y)$$

where:
"lines" is the image that is used to animate the display.
"first_derivative" is the first derivative of the range map, or the slope map.
"ramp" is an image of increasing intensity, where intensity $(x,y) = x$. Ramp is a periodic, monotoniely increasing function.

This creates an image (lines) that can be animated by incrementing the pixel values:

$$\text{lines}(x,y) = \text{lines}(x,y) + \text{speed};$$

where:
speed is a constant that is added to each pixel of the image.

Any of the 8-bit planes can be used for the display. The lower order bit planes produce a display with greater line density than the higher order bit planes of the "lines" image. Bit plane zero, or the least significant bit planes will produce a display that has one pixel wide pickets. In bit plane one, the picket width is double, etc. Examples of an animated picket fence ray trace display produced by the above-described technique is shown in FIGS. 7a and 7b.

It will be appreciated that while, in accordance with the preferred embodiment, the third derivative is used, in certain circumstances, adequate results may be obtained with the first or second derivatives alone.

Figure 7A:
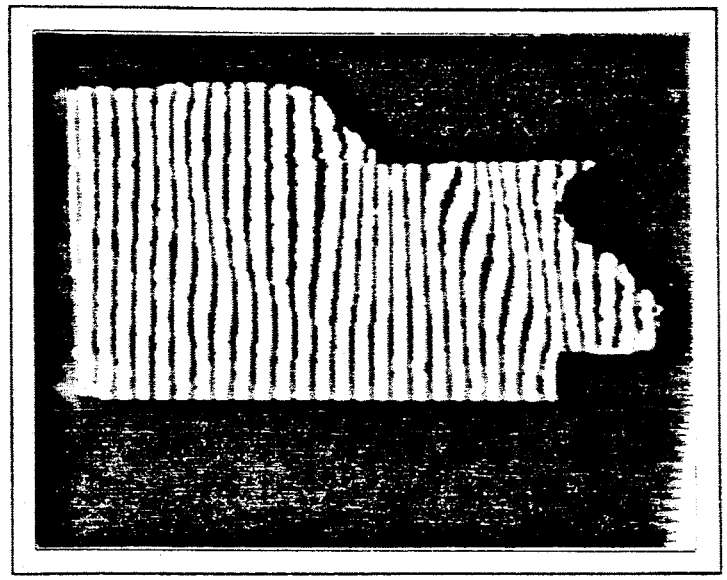
FIGS. 7a and 7b are two views of the picket fence display produced in accordance with the present invention.
Figure 7B:
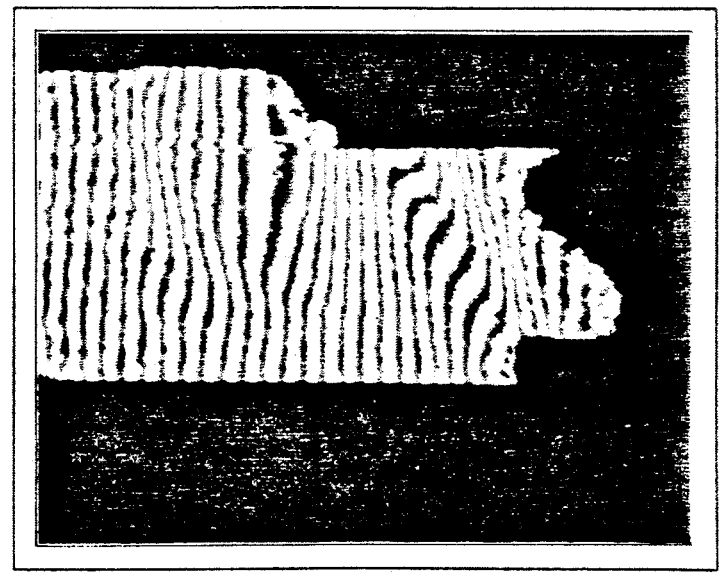

It will be appreciated that, in addition to the picket fence display shown in FIGS. 7a and 7b, other kinds of display and means of utilizing the results from the image processing module 76 may be utilized. For example, additional software tools for locating and indicating defects on the parts according to slope may be provided. Manual windowing capability to identify inspection areas of interest or of no interest may be used. Software tools for producing cross-sectional profile plots may be employed as well as a cursor with x,y,z readout of surface locations may be utilized. Also, the fence pattern program 78 may be applied to the contour directly or to any of the derivatives. It should be noted that the fence pattern will be the same, regardless of perspective, thus providing a true picture of defects present that may be evident from one or more perspectives of view of the panel. Further, the sensitivity and speed of the motion of the fence pattern across the panel may be adjusted or stopped all together to suit the operator's needs.

The present invention can reveal relatively subtle defects on panels. For example, it has been able to locate low points with depths of depression in the range of 0.0005 to 0.0015 inches, which cover areas typically about 2 inches with some as much as 6 inches. On larger defects, the wide, low or high spots had actually been marked by an inspector by two lows or high spots in adjacent areas in accordance with previous techniques. Also, the phase shift analysis causes the resulting moire fringes to scan across the panel, providing measurement information everywhere across the panel. The scanning of the fringes permits the fringe information to be separated from variations in lighting, dirt or marks on the part or shadows from other sources. Scanning the moire pattern over the surface also permits multiple sampling at each point seen on the panel, thereby leading to higher accuracy capability.

From the foregoing, it can be seen that the present invention provides a moire defect detection technique which is able to quantify defects in panels in an unambiguous manner by direct contour measurement. Also, the sensitivity of the results do not vary across the field providing the capability to find and quantify defects independently of how a surface is viewed, unlike prior highlighting techniques in which sensitivity did vary across the field. The technique of the present invention does not require a highly skilled inspector to interpret the results, and also gives results which are more consistent. Defects are thus characterized in an unambiguous quantitative manner with high accuracy. Those skilled in the art can appreciate that other advantages can be obtained from the use of this invention, and that modification may be made without departing from the true spirit of the invention after studying the specification, drawings, and following claims.

What is in the claims:

1. A moire interferometry system for measuring the shape of a contoured surface, said system comprising:
   a projection system including a light source and a master grating, said projection system projecting the lines of said grating onto said surface;
   a viewing system including a means for recording individuals pixels of an image of said surface, and a submaster grating, said means for recording disposed so as to view said master grating lines on said surface through said submaster grating, the intersection of said projected lines of said surface and said lines on said submaster grating producing moire fringes;
   means for introducing a phase shift in said moire fringes;
   means for producing a phase map of said surface using a plurality of sets of said phase shifted moire fringes;
   means for normalizing said phase map by subtracting a reference phase map from said phase map;
   means for performing a derivative operation on said image and producing a derivative image; and
   means for thresholding said derivative image, wherein pixels in said derivative image exceeding said threshold are identified as having the largest change in contour.

2. The moire interferometry system of claim 1 wherein said means for introducing a phase shift further comprises means for acquiring a plurality of images of each of five different phase shifted moire images.

3. The moire interferometry system of claim 2 further comprising means for summing said plurality of images in each of said five images.

4. The moire interferometry system of claim 1 wherein said means for introducing a phase shift further comprises means for normalizing each image resulting from each said phase shift.

5. The moire interferometry system of claim 4 wherein said means form normalizing further comprises means for determining if the pixel values in a given location are greater than a predetermined threshold and, if so, dividing all said pixels by a multiplier.

6. The moire interferometry system of claim 1 wherein said means for providing a phase map further comprises means for extracting values for a fractional phase and contrast.

7. The moire interferometry system of claim 6 wherein said means for producing a phase map further comprises means for discarding pixels with said contrast value less than a predetermined threshold.

8. The moire interferometry system of claim 1 wherein said means for producing a phase map further comprises means for performing a modular pi phase unwrapping procedure.

9. The moire interferometry system of claim 1 further comprising means for performing smoothing and hole filling on said phase map.

10. The moire interferometry system of claim 1 further comprising means for displaying said derivative image.

11. The moire interferometry system of claim 10 wherein said means for displaying further comprises means for producing a picket fence display of said derivative image.

12. The moire interferometry system of claim 1 wherein said contours on said surface are defects.

13. A method for measuring the shape of a contoured surface using moire interferometry, said method comprising:
   providing a moire interferometry system including a projection system and having a light source and a master grating, and a viewing system including a means for recording individual pixels of an image on said surface and a submaster grating;
   projecting the lines of said master grating on to said surface using said light source;
   recording said lines on said surface with said means for recording viewed through said submaster grating, wherein the intersection of said projected lines on said surface and said lines on said submaster grating produce moire fringes;
   introducing a phase shift into said moire fringes;
   producing a phase map of said surface using a plurality of said phase shifted moire fringes;
   normalizing said phase map by subtracting a reference phase map from said phase map;
   performing a derivative operation on said image and producing a derivative image; and
   thresholding said derivative image, wherein pixels in said derivative image exceeding said threshold are identified as having the largest change in contour.

14. The method of claim 13 wherein said step of introducing a phase shift further comprises the step of acquiring a plurality of images of each of five different phase shifted moire images.

15. The method of claim 14 further comprising the step of summing said plurality of images in each of said five images.

16. The method of claim 13 wherein said step of introducing a phase shift further comprises the step of normalizing each image resulting from each of said phase shifts.

17. The method of claim 16 wherein said step of normalizing further comprises the step of determining if the pixel value in a given location is greater than a predetermined threshold and, if so, dividing all said pixels by a multiplier.

18. The method of claim 13 wherein said step of producing a phase map further comprises the step of extracting values for fractional phase and contrast.

19. The method of claim 18 wherein said step of providing a phase map further comprises the step of discarding pixels with said contrast value less than a predetermined threshold.

20. The method of claim 13 wherein said step of producing a phase map further comprises the step of performing a modular pi phase unwrapping procedure.

21. The method of claim 13 further comprising the step of performing smoothing and hole filling on said phase map.

22. The method of claim 13 further comprising the step of displaying said derivative image.

23. The method of claim 22 wherein said step of displaying further comprises displaying a picket fence display of said derivative image.

24. The method of claim 13 further comprising the step of repeating said derivative operation three times to produce a third derivative image.

* * * * *